(12) United States Patent
Petersson

(10) Patent No.: US 6,574,198 B1
(45) Date of Patent: Jun. 3, 2003

(54) SYSTEMS AND METHODS FOR MAINTAINING A SIGNALING LINK IN A COMMUNICATIONS NETWORK

(75) Inventor: Stefan Petersson, Frisco, TX (US)

(73) Assignee: Ericsson Inc., Plano, TX (US)

( * ) Notice: Subject to any disclaimer, the term of this patent is extended or adjusted under 35 U.S.C. 154(b) by 565 days.

(21) Appl. No.: 09/611,100

(22) Filed: Jul. 6, 2000

(51) Int. Cl.[7] .......................... H04L 12/26; H04B 7/05; H04B 7/185

(52) U.S. Cl. ................. 370/252; 370/278; 370/316; 370/349; 455/427

(58) Field of Search ................. 370/230, 235, 370/252, 277, 278, 316, 310, 349, 400, 412, 422, 467, 469; 455/427, 73, 12.1; 343/700 R; 342/359, 358; 701/226, 13

(56) References Cited

U.S. PATENT DOCUMENTS

| | | | | |
|---|---|---|---|---|
| 4,811,380 A | * | 3/1989 | Spear | 379/60 |
| 5,506,780 A | * | 4/1996 | Montenbruck et al. | 364/459 |
| 5,659,487 A | | 8/1997 | Cho | 395/200.3 |
| 5,937,349 A | | 8/1999 | Andersen | 455/431 |
| 6,070,073 A | * | 5/2000 | Maveddat et al. | 455/428 |
| 6,137,783 A | * | 10/2000 | Sallberg | 370/316 |
| 6,236,656 B1 | * | 5/2001 | Westerberg et al. | 370/395 |

FOREIGN PATENT DOCUMENTS

WO    WO 99/39529    8/1999

* cited by examiner

*Primary Examiner*—Huy D. Vu
*Assistant Examiner*—Duc Ho
(74) *Attorney, Agent, or Firm*—Roger S. Burleigh; Ericsson Inc.

(57) ABSTRACT

Systems and methods related to maintaining a signaling link between network terminals in a communications network. Periodic receiver ready frames are transmitted from a first terminal to a second terminal when there are no data frames to be transmitted. A temporal period is determined during which a predetermined condition will affect communications with the second terminal; the predetermined condition can be, for example, a period during which the sun will be within a predetermined subtended angle of an antenna associated with the second terminal. The second terminal transmits a pause frame to the first terminal prior to the temporal period; the pause frame includes the identification of the temporal period. The first terminal then pauses the transmission of data frames and the periodic receiver ready frames during the temporal period, and resumes the transmission of data frames and periodic receiver ready frames subsequent to the expiration of the temporal period, whereby it is unnecessary to re-establish a signaling link between the first and second terminals upon the expiration of the temporal period.

21 Claims, 4 Drawing Sheets

SYSTEMS AND METHODS FOR MAINTAINING A SIGNALING LINK IN A COMMUNICATIONS NETWORK

TECHNICAL FIELD OF THE INVENTION

The present invention is directed, in general, to communications networks, and, more specifically, to systems and methods for maintaining signaling links during outage periods in communications networks.

BACKGROUND OF THE INVENTION

The world is currently experiencing revolutionary changes in communications systems, particularly in the area of wireless communications systems. At present, conventional wireless communications systems for general public use are terrestrial-based systems, such as a Global Service for Mobile (GSM) communications system. Advanced systems, however, utilize low earth orbit (LEO) and/or geo-stationary satellites. In addition to the use of satellites for voice transmissions, such satellites can also be used for the transmission of data and video.

A number of proposed broadband satellite systems will operate in the Ka (30 MHz) band. Such systems will be capable of transmitting several million bits per second and, thus, will support services such as the interconnection of remote Local Area Networks, or as an adjunct or alternative transmission path for Internet services.

A known problem in satellite communications networks is the vulnerability of an antenna, e.g. a satellite dish, to damage if the pointing angle is within a few degrees of the sun. For many terrestrial communications terminals, the pointing angle of its associated satellite dish to a satellite is within a few degrees of the angle to the sun for several minutes four times each year. When this occurs, the temperature in the satellite dish can reach a level that is harmful to its satellite transceiver. The only way to avoid such harmful temperature is to rotate the satellite dish away from its nominal pointing angle during the period(s) in which the sun angle is within a few degrees thereof. During this period, however, communications are lost between the terrestrial communications terminal and the satellite, as well as with any remote terminals that have established signaling links through the satellite to the terrestrial communications terminal associated with the satellite dish. When the satellite dish is returned to its nominal pointing angle, the signaling link to each of the remote terminals must be re-established. In some applications, there can be thousands of remote terminals, and the re-establishment of thousands of signaling links can put a tremendous strain on the signaling resources of the satellite communications network.

In addition to periods in which the sun can affect communications networks, other temporal periods during which a predetermined condition will affect communications can be identified prior to the occurrence thereof. Such "conditions" can be related to system management, maintenance or repair. As in the case of sun outage, if system management, maintenance or repair processes require, or result in, the loss of many signaling links, the re-establishment of those signaling links can put a tremendous strain on the signaling resources of the communications network.

Accordingly, there is a need in the art for improved systems and methods for maintaining signaling links during outage periods in communications networks. Preferably, such systems and methods will eliminate the need to re-establish signaling links to each remote terminal following an outage period, and will utilize the existing hardware infrastructure associated with conventional communications networks, thereby reducing the cost of implementing such improved systems and methods.

SUMMARY OF THE INVENTION

To address the above-discussed deficiencies of the prior art, the present invention relates to systems and methods for maintaining signaling links during outage periods in communications networks. In the exemplary embodiments described hereinafter, periodic receiver ready frames are transmitted from a first terminal to a second terminal when there are no data frames to be transmitted. The periodic receiver ready frames maintain the signaling link between the terminals; e.g., if a receiver ready frame is not received within a predefined period, the connection will time out and the signaling link is lost. According to the principles of the present invention, a temporal period is determined during which a predetermined condition will affect communications with the second terminal; the predetermined condition can be, for example, a period during which the sun will be within a predetermined subtended angle of an antenna associated with the second terminal (in the prior art, all signaling links to a terminal would time out when the terminal's associated satellite dish is rotated away from a pointing angle substantially directed towards the sun). The second terminal transmits a pause frame to the first terminal prior to the temporal period; the pause frame includes the identification of the temporal period. The first terminal then pauses the transmission of data frames and the periodic receiver ready frames during the temporal period, and resumes the transmission of data frames and periodic receiver ready frames subsequent to the expiration of the temporal period, whereby it is unnecessary to re-establish a signaling link between the first and second terminals upon the expiration of the temporal period.

In exemplary embodiments described herein, the pause frame can identify the temporal period by means of a start time value and a duration value, or by means of a start time value and an end time value. Typically, a protocol stack maintains and controls communications between terminals, and the pause frame can be transmitted, for example, over a Logical Link Control (LLC) layer of a signaling link protocol stack. Those skilled in the art are familiar with the nature and operation of a LLC, such as that defined by the IEEE 802.2 standard, incorporated herein by reference. The principles of the present invention are not limited, however, to the use of a particular protocol stack or standard, all such embodiments intended to be within the scope of the claims recited hereinafter.

In addition to pausing the transmission of receiver ready frames during the temporal period of outage, the first terminal can further store any received data frames destined for the second terminal in a buffer during the temporal period, and transmit the frames stored in the buffer upon the expiration of the temporal period. Alternatively, or in addition to buffering such data frames, the first terminal can transmit a message to the device or system that transmitted a data frame to inform it that communications with the second terminal are temporarily suspended.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form, as defined by the claims provided hereinafter.

BRIEF DESCRIPTION OF THE DRAWINGS

For a more complete understanding of the present invention, reference is now made to the following detailed description taken in conjunction with the accompanying drawings, in which.

DETAILED DESCRIPTION

Figure 1:
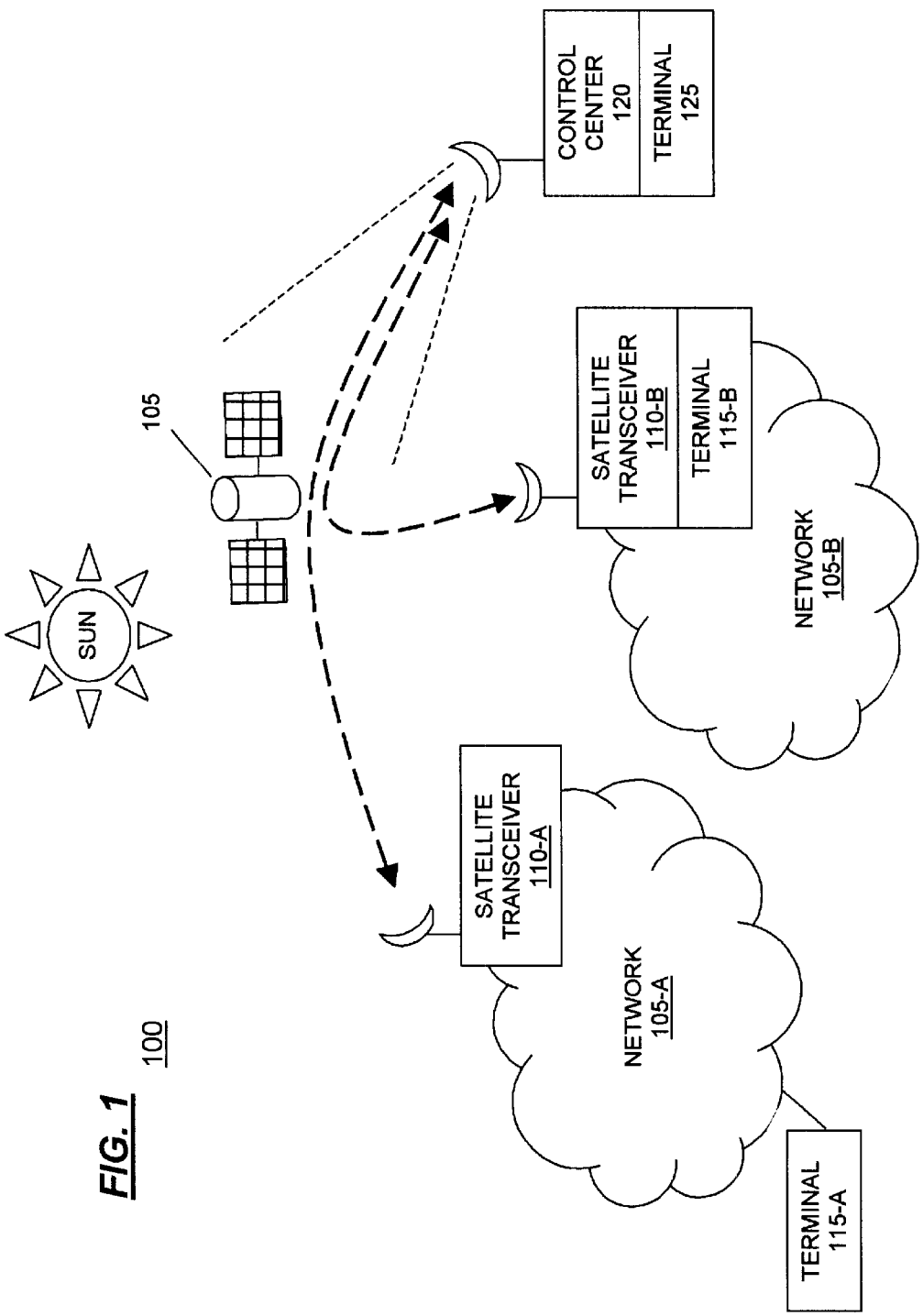
FIG. 1 illustrates an exemplary satellite communications network adaptable in accordance with the principles of the present invention.

Referring first to FIG. 1, illustrated is a block schematic of an exemplary satellite-based system 100 adaptable in accordance with the principles of the present invention. Although the invention will be specifically described as implemented in a satellite-based communications network, those skilled in the art will recognize that the principles of the invention are not limited to such embodiments, but can be utilized to advantage in all types of communications networks. The exemplary system 100 includes networks 105-A and 105-B. The networks 105-A and 105-B can be based on any protocol, such as Internet Protocol (IP) or Asynchronous Transfer Mode (ATM), and need not be the same, provided that suitable gateways are provided for communications between the networks. Coupled to each network are devices, or terminals, such as terminals 115-A and 115-B. A terminal can be, for example, a computer or a telephony device. Furthermore, a terminal need not be physically coupled to a network, but can be in wireless communication therewith; for example, a terminal can be a wireless, or cellular, telephone, and the network can be, for example, a Global Standard for Mobile Communications (GSM) wireless telephony-network.

To facilitate communications between the terminals 115-A and 115-B, networks 105-A and 105-B each include a satellite transceiver, 110-A and 110-B, respectively, for communicating through satellite 105. Each of the terminals 115-A and 115-B can also communicate through satellite 105 with a terminal 125 associated with a network control center 120. The network control center provides a central control point for managing all communications links through satellite 105.

In many conventional networks, data link layer signaling is used to maintain a signaling link between terminals and/or a network control center. The Institute for Electrical and Electronics Engineers (IEEE) 802.2 standard, incorporated herein by reference, defines the data link layer in the Open System. Interconnection (OSI) Reference Model. In accordance with IEEE 802.2, a Logical Link Control (LLC) layer is responsible for the logical link functions of one or more logical links. In a connection mode, or Type 2 operation, the LLC provides services to a network layer for connection-aware links between LLCs of end stations, such as terminals 115-A, 115-B and 125; it is responsible for establishing, using, resetting and terminating the signaling connection, or link, for example, between terminals 115-A, 115-B and 125.

When a terminal is connected, for example, to network control center 120, the LLC layer will periodically send Receiver Ready frames, for example, every 10 seconds, if no other frames are sent. As described previously, a known problem in satellite communications networks is the vulnerability of an antenna, e.g. a satellite dish, to damage if the pointing angle is within a few degrees of the sun., When this occurs, as illustrated in FIG. 1 for the satellite dish associated with network control center 120, the temperature in the satellite dish can reach a level that is harmful to its satellite transceiver. One way to avoid such harmful temperature is to rotate the satellite dish away from its nominal pointing angle during the period(s) in which the sun angle is within a few degrees thereof. During this period, however, the Receiver Ready frames sent by a terminal cannot be received by the network control center 120, and the LLC layer will be disconnected. When the satellite dish is returned to its nominal pointing angle, communications must be re-established between each terminal 115-A, 115-B and the network control center 120. In some applications, there can be thousands of terminals, and the re-establishment of thousands of signaling links can put a tremendous strain on the signaling resources of the satellite communications network 100.

To overcome the problem of re-establishing signaling links that are lost due to the repositioning of a satellite dish, or any other type of predetermined outage condition, the present invention discloses a novel Pause Frame to be introduced for LLC layer signaling. A Pause Frame in accordance with the principles of the present invention can be implemented in addition to conventional frame types used for OSI layer 2 protocols, and can be accomplished through a direct modification of existing protocol stacks, or by means of a separate software process having access to the protocol stack.

Figure 2:
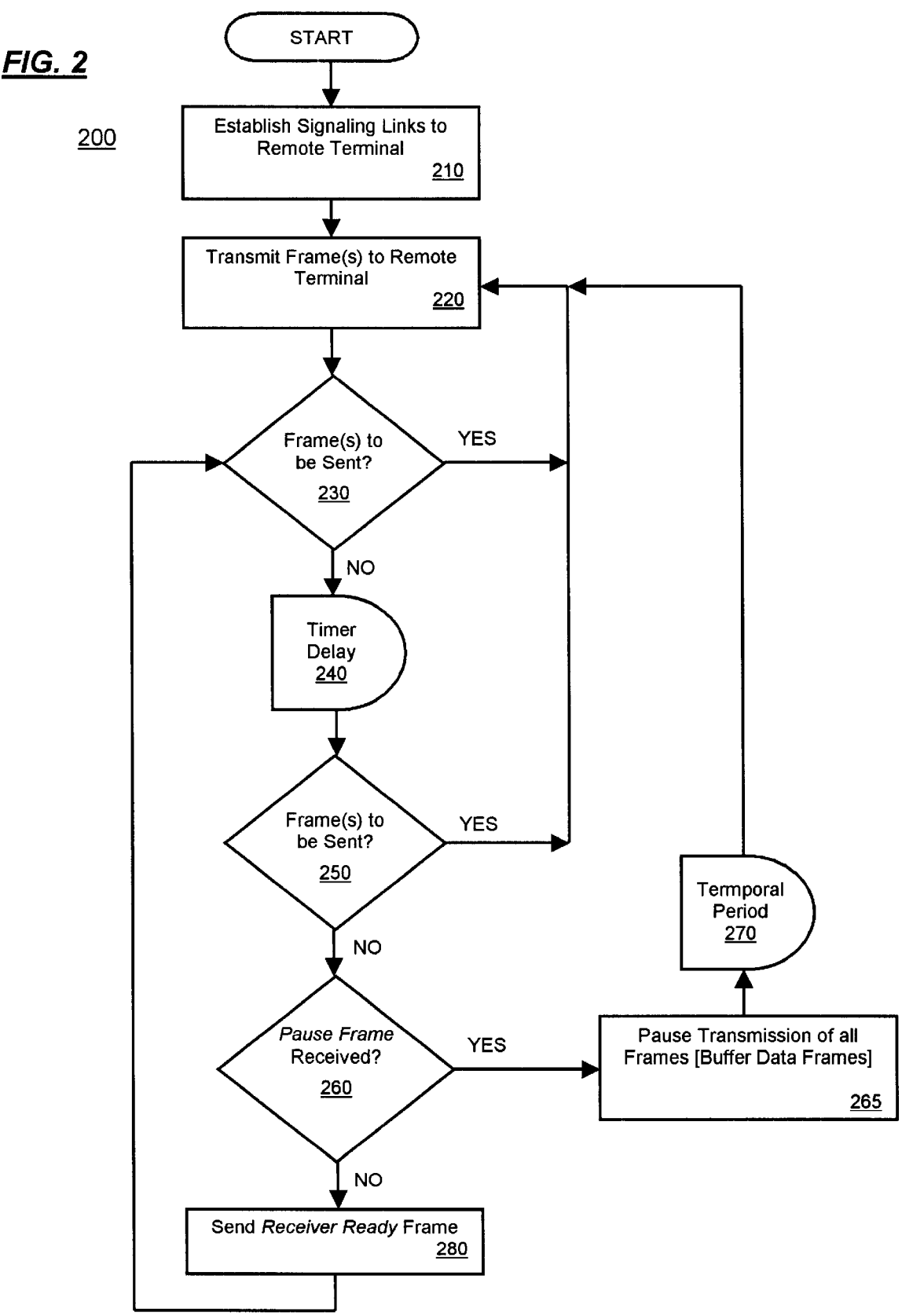
FIGS. 2 and 3 illustrate exemplary methods for maintaining signaling links during outage periods in communications networks in accordance with the principles of the present invention.
Figure 3:
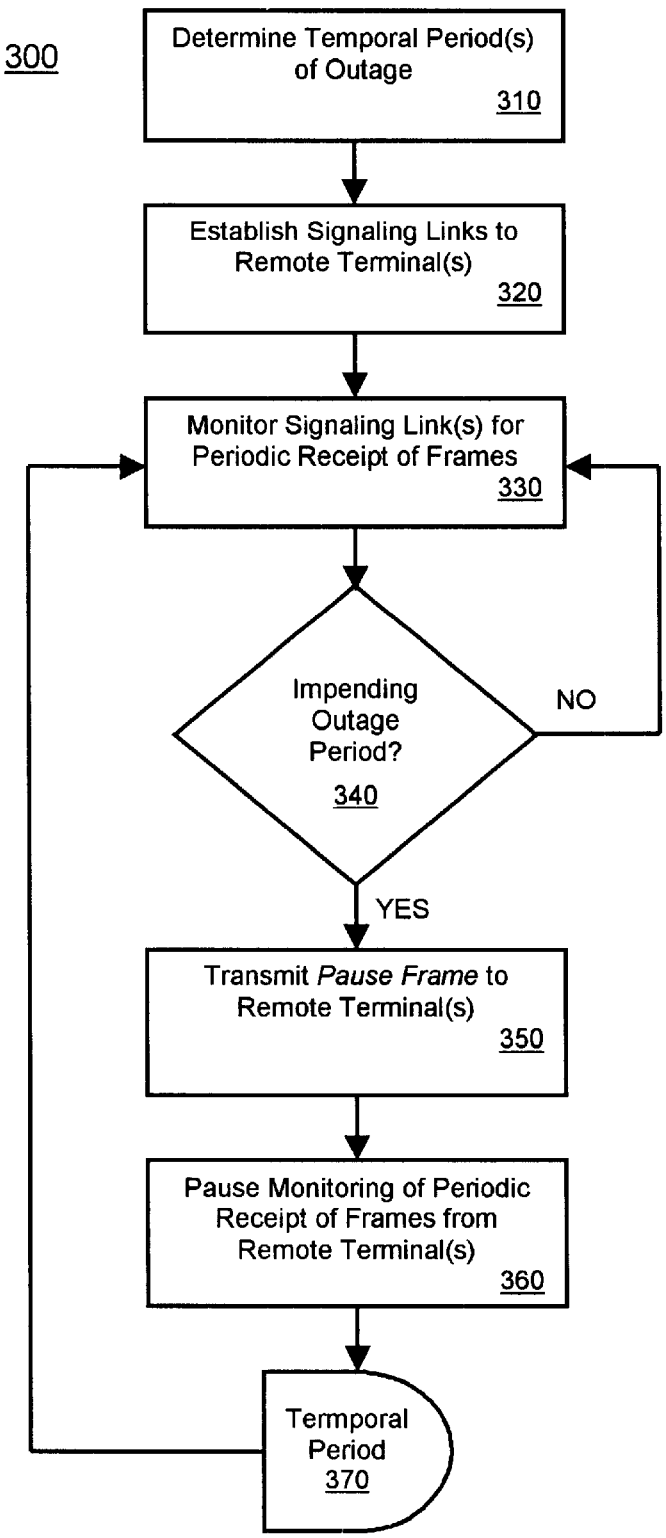

Turning now to FIGS. 2 and 3, illustrated are exemplary methods 200 and 300 that cooperate to maintain signaling links during an outage period in a communications networks; the method 200 is executable by a first network terminal and the method 300 is executable by a second network terminal that is subject to a predetermined outage. The exemplary methods 200 and 300 are preferably implemented as software-defined processes executable by general, or specific, purpose computers. Those skilled in the art are familiar with the general architecture and operation of computer systems suitable for implementation of a software-defined process. In general, such systems include a processor, volatile memory, and a non-volatile media for storing a software-definable process; the processor and volatile memory are operative to retrieve and execute the software-defined process to perform any desired operations, such as those illustrated in FIGS. 2 and 3.

To accomplish the purposes of the present invention, the exemplary method 200 includes the steps 210 through 280, and the exemplary method 300 includes the steps 310 through 370. In step 210, a network terminal, such as terminal 115-A establishes signaling links to a remote network terminal, such as terminal 125; the process of establishing such signaling links using, for example, a protocol stack, is well known to those skilled in the art. Once a signaling link is established between the terminals, the terminal 115-A can transmit/receive frames, such as data frames, to/from the remote terminal 125 (step 220). In Step 230, it is determined whether there are any frames to be sent from terminal 115-A to terminal 125. If there are frames to be sent, processing returns to step 220; otherwise, a delay timer is activated in step 240.

During the delay period associated with step 240, and immediately subsequent to the expiration thereof, it is determined in step 250 whether there are any frames to be sent; if so, processing returns to step 220. The duration of the delay timer is preferably less than a time out period used by terminal 125 to signify the loss of the signaling link; e.g., if no frames are received by terminal 125 from terminal 115-A prior to the expiration of the time out period, the terminal 125 assumes the signaling link has been lost and releases local resources associated with the signaling link. To avoid this loss of the signaling link during periods when no frames are to be sent from terminal 115-A to terminal 125, the terminal 115-A sends a Receiver Ready frame to terminal 125 in Step 280; the receipt of a Receiver Ready frame by terminal 125 causes a reset of the time out period associated with the signaling link with terminal 115-A.

In the exemplary satellite-based system 100, there are temporal periods in which the sun will be within a predetermined subtended angle of a satellite dish associated with the terminal 125, and it is necessary to rotate the satellite dish away from the sun. When the satellite dish is rotated away from its nominal position, it is not possible for the terminal 125 to receive any Receiver Ready frames from terminal 115-A; in conventional systems, this would result in the loss of the signaling link between terminal 115-A and 125. According to the principles of the present invention, however, this problem is avoided by introducing the use of a Pause frame. If the terminal 115-A does not receive a Pause frame from terminal 125 (step 260), as described more fully with respect to FIG. 3, processing proceeds as normal. If a Pause frame is received by terminal 115-A, however, it pauses the transmission of all frames to terminal 125 (step 265), enters into a pause state for the temporal period specified in the Pause frame (step 270), and then resumes the transmission of frames in step 220. The temporal period specified in the Pause frame is preferably of a duration greater than the time period in which the satellite dish associated with terminal 125 will be affected by the presence of the sun within a predetermined subtended angle of the dish (including the time required to rotate and reposition the satellite dish, or otherwise protect the dish from the thermal effects of the sun). In other embodiments, the temporal period is defined as a function of the type of predetermined outage, such as outages associated with repair or maintenance.

Turning now to FIG. 3, the method 300 is generally associated with a terminal remote from terminal 115-A, such as terminal 125, that will be affected by the occurrence of a predetermined outage. The method 300 includes the step 310, in which the temporal period(s) of outage is determined, such as the period during which the sun will be within a predetermined subtended angle of the satellite dish through which terminal 125 communicates with satellite 105. Those skilled in the art are familiar with the principles of Euclidian geometry and Keplerian motion required to predict the period(s) during which the sun will be within a predetermined subtended angle of a satellite dish, and a description herein is not necessary to an understanding of the principles of the present invention. For other types of outage conditions, such as repair or maintenance, the temporal period can be manually selected by a system operator based on the expected time necessary to perform the required repair or maintenance.

Step 320 corresponds to the step 210 of method 200; in this step, the terminal 125 establishes signaling links with one or more remote terminals, such as terminal 115-A. In step 330, the terminal 125 monitors the signaling link(s) for the periodic receipt of frames from the remote terminal(s). A time out period is associated with each signaling link, and, if no frames are received on a particular link during a predefined time out period, it is assumed that the signaling link has been lost and the terminal 125 releases any local resources associated with the signaling link.

In step 340, it is determined whether there is an impending outage period. If not, processing continues in step 330. If an outage period is impending, however, the terminal 125 transmits a Pause Frame to each remote terminal in step 350 (the receipt of a Pause Frame by the remote terminal is determined in step 260 of method 200). As noted previously, a Pause Frame identifies the temporal period of the impending outage, for example, either by means of a start time value and a duration value, or by means of a start time value and an end time value.

After transmitting a Pause Frame to each remote terminal, the terminal 125 pauses the monitoring of periodic receipt of frames from each remote terminal (step 360); this step essentially prevents the triggering of a time out for a signaling link with a remote terminal, and the resulting release of local resources associated therewith that would necessitate re-establishing such signaling link upon the resumption of normal communications through satellite 105. The terminal 125 then enters into a communications suspend state for the temporal period (step 370). During this period, the satellite dish associated with terminal 125 can be rotated away from and then repositioned to its nominal pointing angle, or otherwise be protected from the thermal effects of the sun, or the required repair or maintenance operations that necessitated the outage can be performed. Upon the expiration of the temporal period, processing resumes at step 330.

With reference to the exemplary methods 200 and 300, those skilled in the art will recognize-that a signaling link between, for example, terminal 125 and terminal 115-A needs to be established only once (step 210 in conjunction with step 320), even though actual communications are lost between the terminal 125 and satellite 105 during the temporal period. This provides a great advantage over prior art systems, in which a period of lost communications due to outage generally requires a process of re-establishing signaling links between terminal 125 and possibly thousands of remote terminals, such as terminal 115-A.

Figure 4:
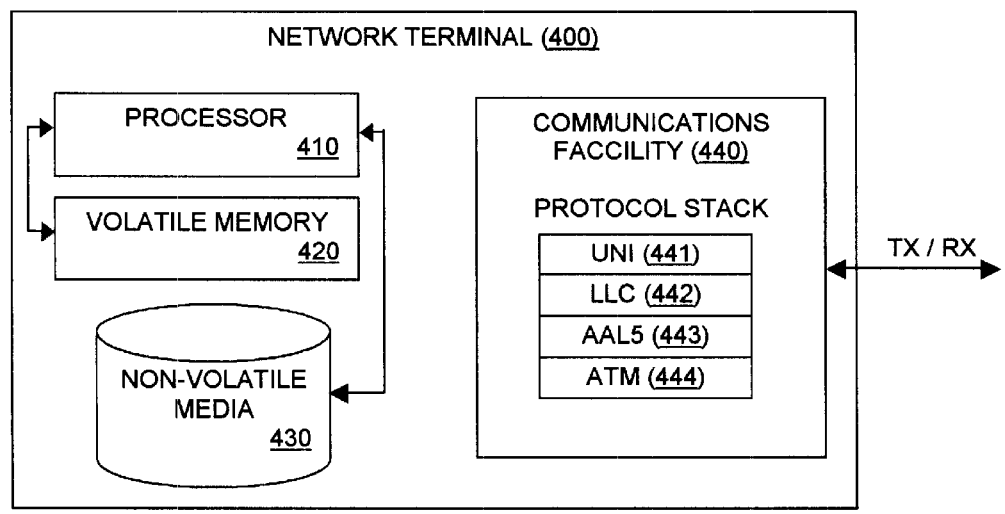
FIG. 4 illustrates an exemplary network terminal.

FIG. 4 illustrates an exemplary network terminal 400 that can be adapted to provide communications services in accordance with the principles of the present invention. The exemplary network terminal 400 can be a general, or specific, purpose computing system operative to perform the software-definable processes disclosed herein; the architecture and operation of general and specific purpose computers are known to those skilled in the art and, thus, a detailed description herein is not necessary to an understanding of the present invention. In general, as shown in FIG. 4, the exemplary network terminal 400 includes a processor 410, volatile memory 420, such as random access memory (RAM), and a non-volatile media 430, such as a magnetic storage device, for storing a software-definable process, such as the exemplary processes illustrated in FIGS. 2 and 3. The processor 410 and volatile memory 420 are operative to retrieve and execute the software-definable process from the non-volatile media 430.

The exemplary network terminal 400 further includes a Communications Facility 440 that is operative to establish and maintain one or more signaling links between the network terminal 400 and one or more remote terminals (not shown). The Communications Facility 440 is an abstracted functionality that can be implemented in hardware, software, firmware, or a combination thereof according to principles well known in the art. The Communications Facility 440 includes a protocol stack having layers that work together to control the transmission (TX) and receipt (RX) of information between processes and services local to network terminal 400 and remote terminals or processes. Those skilled in the art are familiar with the OSI Reference Model that defines seven protocol layers, which is often called a "stack." The term "stack" also refers to the actual software that processes the protocols. So, for example, programmers sometimes refer to "loading a stack," which means to load the software required to use a specific set of protocols. Another common phrase is "binding a stack," which refers to linking a set of network protocols to a network interface card (NIC). The exemplary protocol stack illustrated in FIG. 4 includes four layers specifically adapted to communications using Asynchronous Transfer Mode (ATM); the exemplary protocol stack includes a User to Network Interface (UNI) layer 441, a Logical Link Control (LLC) layer 442, an ATM Adaptation Layer 5 (AAL5) layer, and an ATM layer 444.

Figure 5:
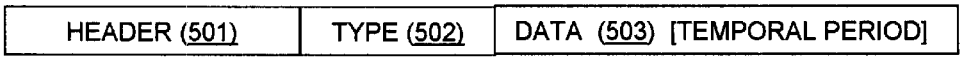
FIG. 5 illustrates an exemplary Pause frame in accordance with the principles of the present invention.

As described more fully supra, the principles of the present invention can be implemented through a modification of the protocols used in the datalink layer of a protocol stack, such as the LLC layer 442. Such implementations of a Pause Frame as disclosed herein can be accomplished through a direct modification of existing protocol stacks, or by means of a separate software process having access to the protocol stack. For example, the protocols defined in the IEEE 802.2 standard can be adapted to include a Pause Frame as disclosed herein. FIG. 5 illustrates an exemplary Pause Frame 500. As in conventional frames, the Pause Frame 500 includes a header field 501, frame type field 502, and data field(s) 503. The type field 502 specifically identifies the frame as a Pause Frame, the header field 501 can include a source address that specifically identifies the terminal that will experience a predetermined outage condition, and a destination address of the terminal that is to be instructed to pause the transmission of data and Receiver Ready frames to the terminal that will experience the outage condition. In alternate embodiments, a broadcast message format can be used to instruct many different terminals to pause the transmission of data and Receiver Ready frames. According to the principles of the present invention, the data field 503 includes an identification of the temporal period during which a predetermined condition will affect communications with the remote terminal identified in the source address of the header field 501. As noted previously, the temporal period can be identified by means of a start time value and a duration value, or by means of a start time value and an end time value. Alternatively, it can be assumed that the pause state should be entered immediately, in which case the temporal period can be simply identified as a duration value.

From the foregoing, those skilled in the art will recognize that the present invention provides significant advantages to the art of communications networks, and, in particular, to the art of satellite communications networks. The principles of the present invention can be implemented to maintain signaling links during predetermined outage.periods in communications networks, thereby eliminating the need to re-establish signaling links to each remote terminal following an outage period. Furthermore, the principles of the present invention can utilize the existing hardware infrastructure associated with conventional communications networks, thereby reducing the cost of implementing such principles.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method for maintaining a signaling link between a first terminal and a second terminal in a communications network, said method comprising the steps of:

transmitting periodic receiver ready frames from said first terminal to said second terminal when there are no data frames to be transmitted therebetween;

determining a temporal period during which a predetermined condition will affect communications with said second terminal;

transmitting a pause frame from said second terminal to said first terminal prior to said temporal period, wherein said pause frame comprises information indicating the beginning and duration of said temporal period;

pausing the transmission of data frames and said periodic receiver ready frames from said first terminal to said second terminal during said temporal period; and resuming the transmission of data frames and said periodic receiver ready frames from said first terminal to said second terminal subsequent to the expiration of said temporal period, whereby it is unnecessary to re-establish said signaling link between said first terminal and a second terminal upon the expiration of said temporal period.

2. The method recited in claim 1, wherein said predetermined condition is a sun outage period during which the sun will be within a predetermined subtended angle of an antenna associated with said second terminal.

3. The method recited in claim 2, further comprising the step of rotating said antenna associated with said second terminal away from its nominal position during said temporal period.

4. The method recited in claim 1, wherein said pause frame identifies said temporal period by means of a start time value and a duration value.

5. The method recited in claim 1, wherein said pause frame identifies said temporal period by means of a start time value and an end time value.

6. The method recited in claim 1, wherein said pause frame is transmitted over a Logical Link Control (LLC) layer of a signaling link protocol stack.

7. The method recited in claim 6, wherein said LLC conforms to the IEEE 802.2 standard.

8. The method recited in claim 1, further comprising the steps of:

storing data frames destined for said second terminal in a buffer during said temporal period; and transmitting said data frames stored in said buffer upon the expiration of said temporal period.

9. A network terminal for transmitting information through a communications network, said network terminal comprising:

a processor;

volatile memory; and a non-volatile media for storing a software-definable process, said processor and volatile memory being operative to retrieve and execute said software-definable process to perform the steps of:

transmitting periodic receiver ready frames to a remote terminal when there are no data frames to be transmitted therebetween;

receiving a pause frame from said remote terminal, said pause frame identifying a temporal period during which a predetermined condition will affect communications with said remote terminal, wherein said pause frame comprises information indicating the beginning and duration of said temporal period;

pausing the transmission of data frames and said periodic receiver ready frames to said remote terminal during said temporal period; and resuming the transmission of data frames and said periodic receiver ready frames to said remote terminal upon the expiration of said temporal period, whereby it is unnecessary to re-establish a signaling link between said network terminal and said remote terminal upon the expiration of said temporal period.

10. The network terminal recited in claim 9, wherein said predetermined condition is a sun outage period during which the sun will be within a predetermined subtended angle of an antenna associated with said remote terminal.

11. The network terminal recited in claim 9, wherein said pause frame identifies said temporal period by means of a start time value and a duration value.

12. The network terminal recited in claim 9, wherein said pause frame identifies said temporal period by means of a start time value and an end time value.

13. The network terminal recited in claim 9, wherein said pause frame is received over a Logical Link Control (LLC) layer of a signaling link protocol stack.

14. The network terminal recited in claim 13, wherein said LLC conforms to the IEEE 802.2 standard.

15. The network terminal recited in claim 9, wherein said processor and volatile memory are further operative to retrieve and execute a software-definable process to perform the steps of:

storing data frames destined for said remote terminal in a buffer during said temporal period; and transmitting said data frames stored in said buffer upon the expiration of said temporal period.

16. A network terminal for transmitting information through a communications network, said network terminal comprising:

a processor;

volatile memory; and a non-volatile media for storing a software-definable process, said processor and volatile memory being operative to retrieve and execute said software-definable process to perform the steps of:

monitoring the receipt of periodic receiver ready frames from a remote terminal when there are no data frames to be transmitted therefrom, the receipt of said periodic receiver ready frames causing said network terminal to maintain a signaling link to said remote terminal;

determining a temporal period during which a predetermined condition will affect communications with said remote terminal;

transmitting a pause frame to said remote terminal prior to said temporal period, said pause frame usable by said remote terminal to temporarily cease the transmission of said periodic receiver ready frames during said temporal period, wherein said pause frame comprises information indicating the beginning and duration of said temporal period;

pausing the monitoring of receipt of said periodic receiver ready frames during said temporal period; and resuming the monitoring of receipt of said periodic receiver ready frames upon the expiration of said temporal period, whereby it is unnecessary to re-establish a signaling link between said network terminal and said remote terminal upon the expiration of said temporal period.

17. The network terminal recited in claim 16, wherein said predetermined condition is a sun outage period during which the sun will be within a predetermined subtended angle of an antenna associated with said network terminal.

18. The network terminal recited in claim 16, wherein said pause frame identifies said temporal period by means of a start time value and a duration value.

19. The network terminal recited in claim 16, wherein said pause frame identifies said temporal period by means of a start time value and an end time value.

20. The network terminal recited in claim 16, wherein said pause frame is transmitted over a Logical Link Control (LLC) layer of a signaling link protocol stack.

21. The network terminal recited in claim 19, wherein said LLC conforms to the IEEE 802.2 standard.

\* \* \* \* \*